Figure 4:
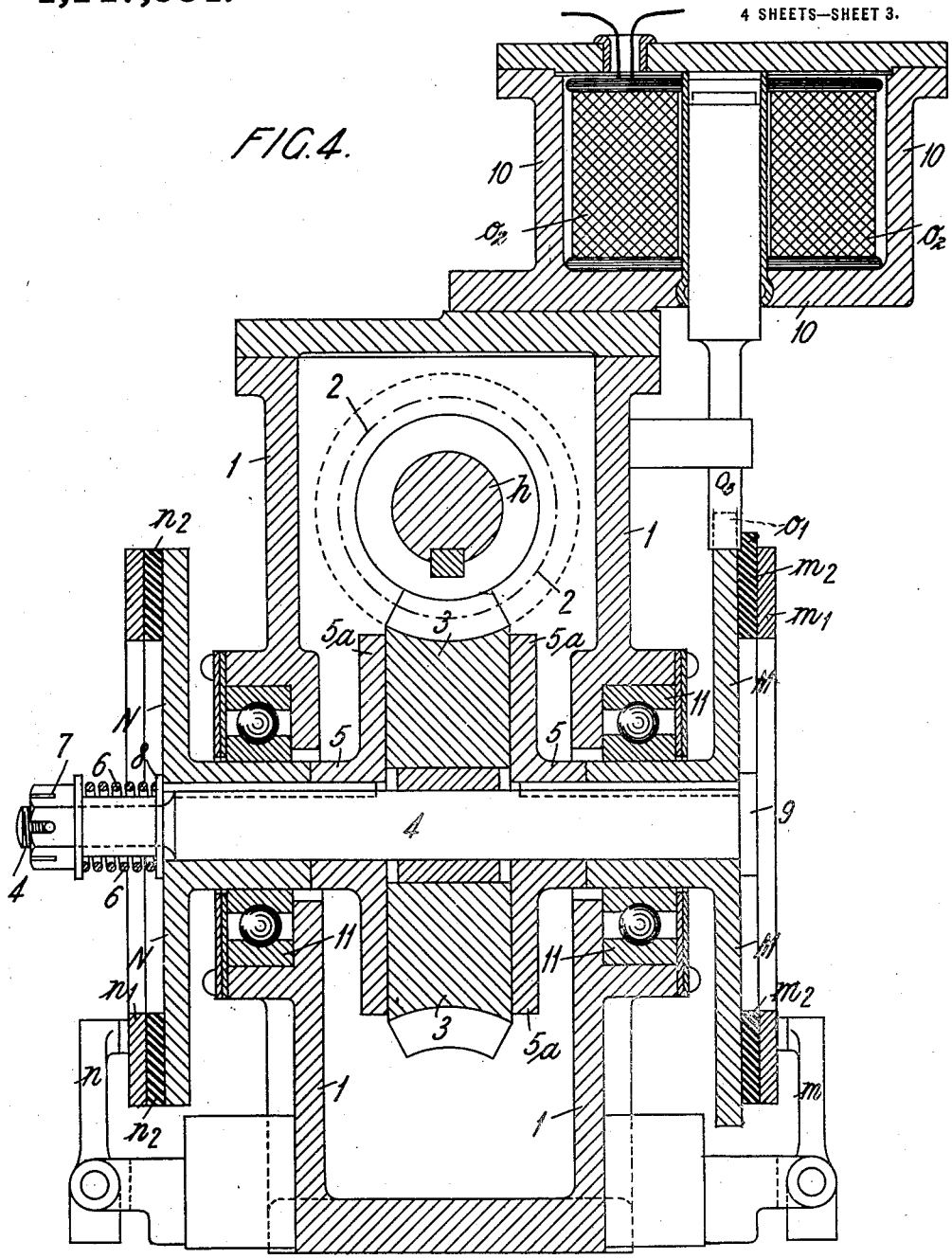

A. P. WOOD.
APPARATUS FOR ELECTRICALLY CONTROLLING PLANING MACHINES AND THE LIKE
RECIPROCATING TOOLS.
APPLICATION FILED AUG. 19, 1912.
1,147,584.
Patented July 20, 1915.
4 SHEETS—SHEET 1.
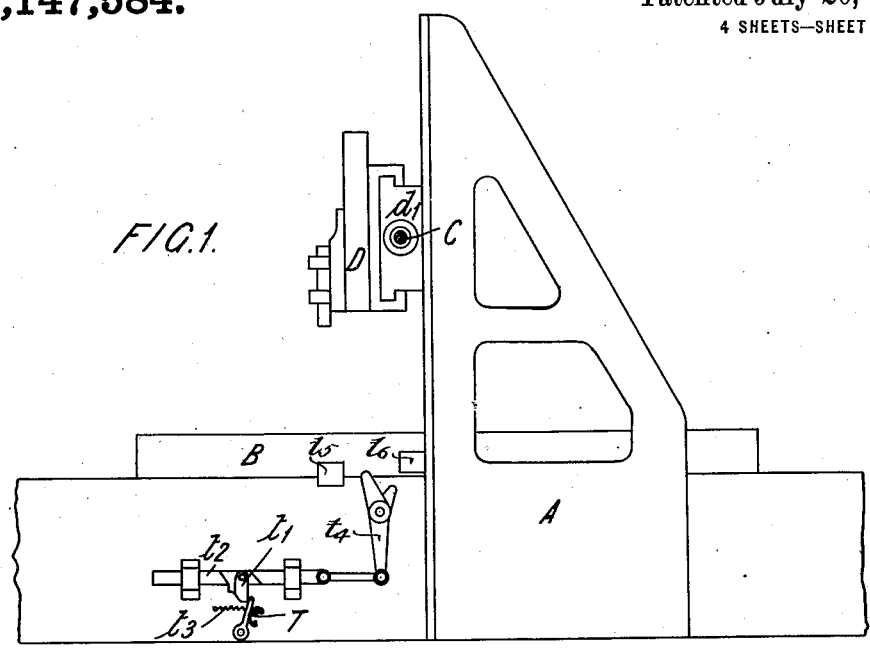
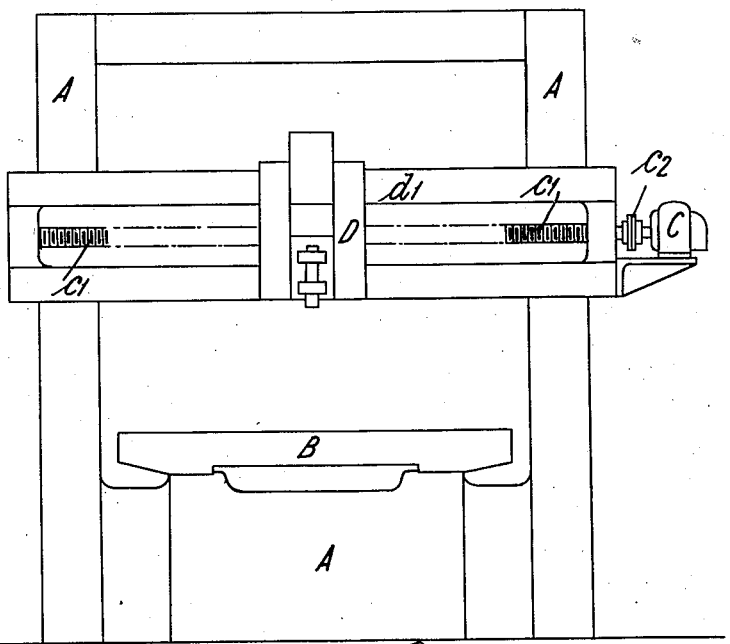

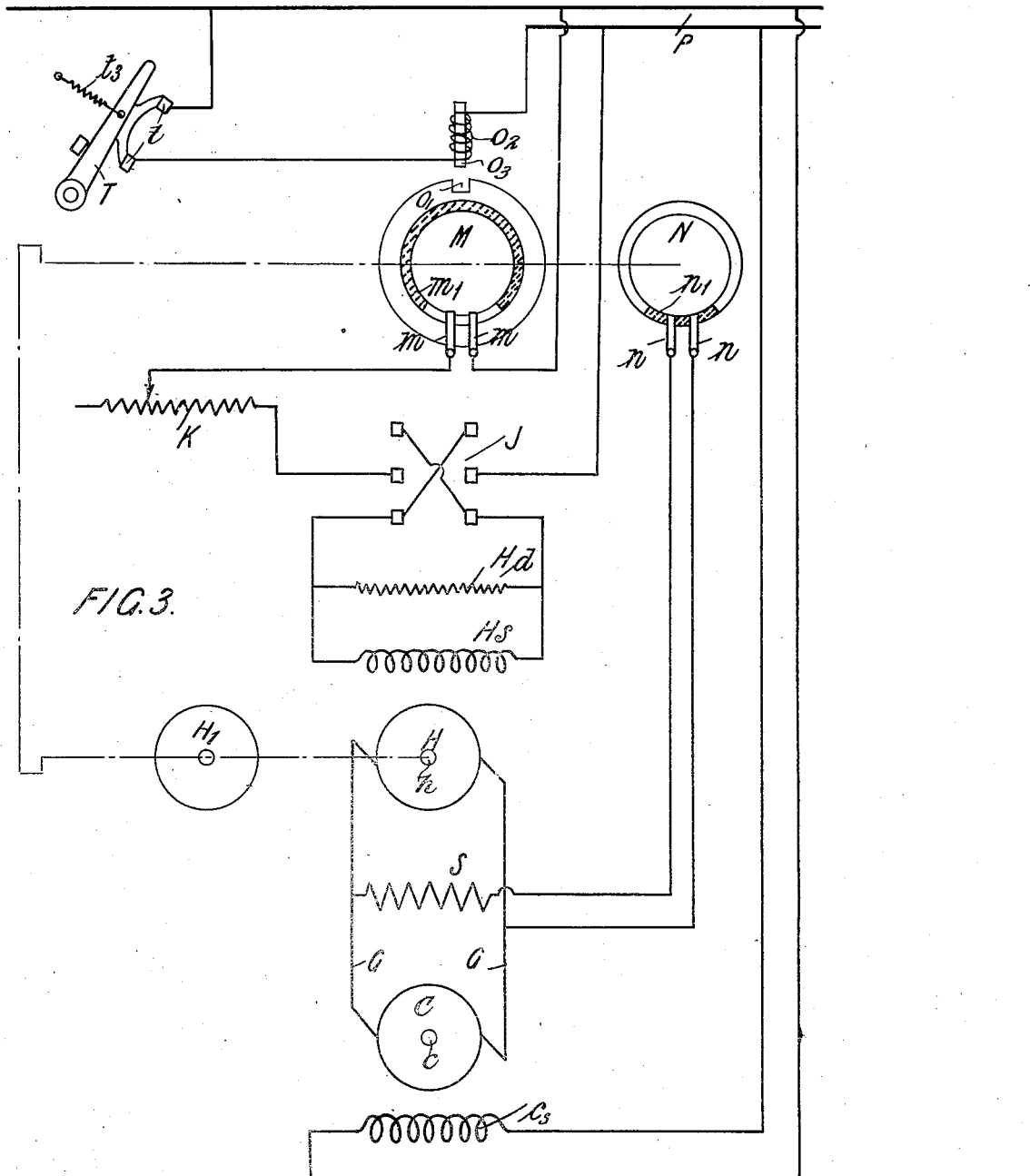

A. P. WOOD.
APPARATUS FOR ELECTRICALLY CONTROLLING PLANING MACHINES AND THE LIKE RECIPROCATING TOOLS.
APPLICATION FILED AUG. 19, 1912.

1,147,584. Patented July 20, 1915.
4 SHEETS—SHEET 3.

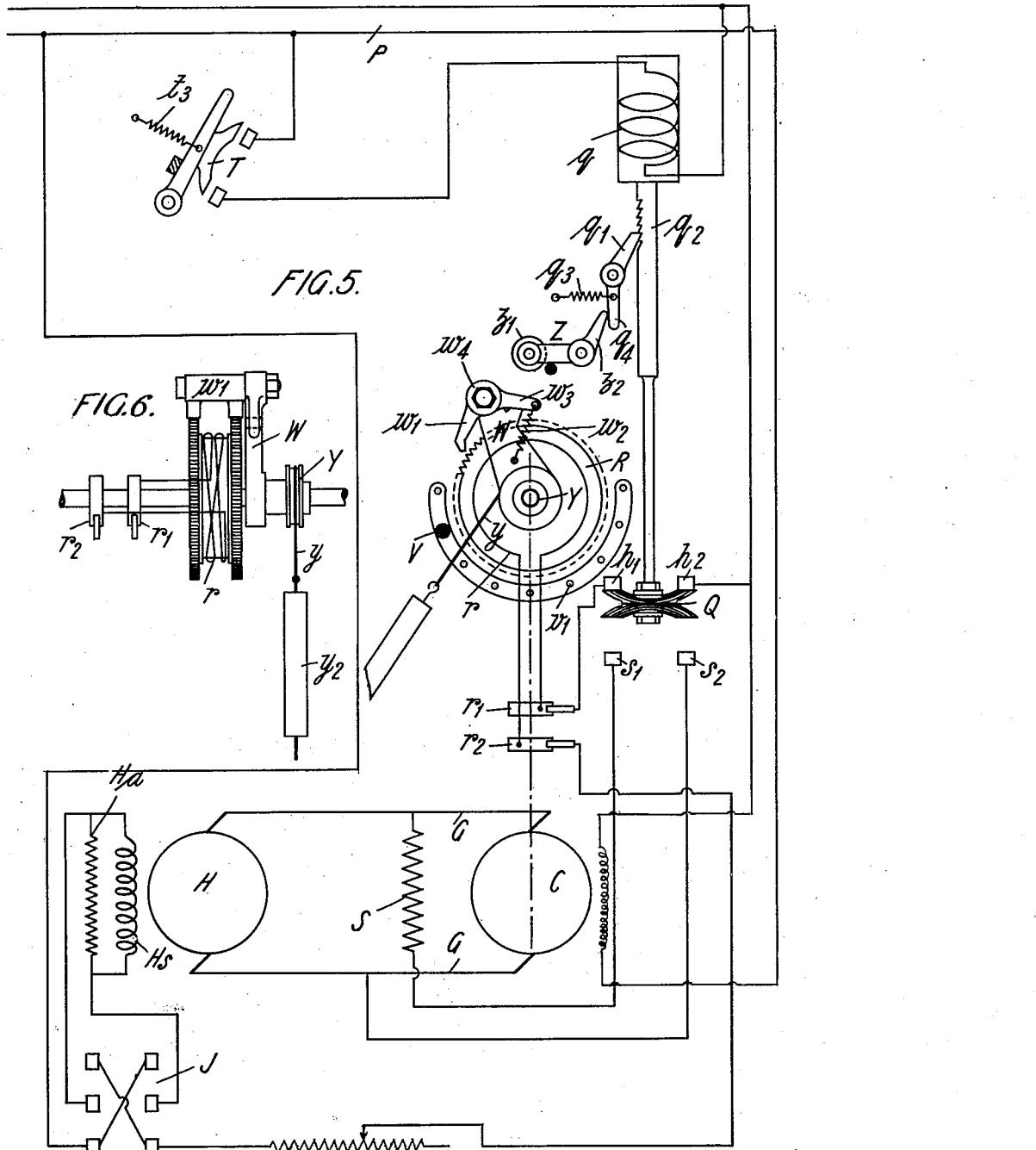

UNITED STATES PATENT OFFICE.

ARTHUR PEMBERTON WOOD, OF HALE, ENGLAND.

APPARATUS FOR ELECTRICALLY CONTROLLING PLANING-MACHINES AND THE LIKE RECIPROCATING TOOLS.

1,147,584.   Specification of Letters Patent.   Patented July 20, 1915.

Application filed August 19, 1912. Serial No. 715,875.

*To all whom it may concern:*

Be it known that I, ARTHUR PEMBERTON WOOD, a subject of the King of Great Britain, and residing in Hale, in the county of Chester, England, have invented certain new and useful Improvements in Apparatus for Electrically Controlling Planing-Machines and the like Reciprocating Tools, of which the following is a specification.

This invention relates to apparatus for controlling an electromotor geared to the feed or traverse screw of a reciprocating machine tool such as a planer, and the object of the invention is to provide an apparatus, adapted to be actuated by the machine tappet gear at the end of a stroke, and by means of which a definite and adjustable angular movement is imparted to the said electromotor upon each such actuation.

The invention is illustrated in the accompanying drawings in which:—

Figure 1 is a side elevation of a planer with the motor attached to the feed screw; Fig. 2 is a corresponding end view; Fig. 3 is a diagram of the connections and switch gear; Fig. 4 is a view of a detail of the switch gear shown in Fig. 3; Figs. 5 and 6 illustrate a modification of the switch gear, the views being in the diagrammatic, Fig. 5 showing the main connections and Fig. 6 illustrating the arrangement of the magnetic detent employed in this modification.

A is the main frame of the planer, B the table, D the tool holder, $d^1$ the cross slide, $c^1$ the feed screw and C the motor which in the case illustrated is directly connected to the screw $c^1$ by the coupling $c^2$.

Referring first to Fig. 3, C is the motor, and $Cs$ is a field winding thereof which is connected to any suitable source of potential, say the supply mains P. H is a generator the armature of which is driven, in any convenient manner say by a motor $H^1$, at a constant speed; $Cs$ is a field winding of the motor C and $Hs$ is a field winding of the generator H which field windings are adapted to be connected across any suitable source of potential such as the mains P. The armature of the generator H is connected in series with the armature of the motor C by the connecting wires G; the winding $Hs$ is connected to the source of potential P through a switch which is closed by a device actuated by the tappet gear of the reciprocating tool; in Fig. 3 this switch comprises two contacts $m$ which are adapted to be connected by the conducting part $m^1$ on the disk M which is driven and controlled as hereinafter described. A reversing switch J to change the direction of the current in the winding $Hs$ is fitted; a rheostat K is included in the circuit of the winding $Hs$ to vary the magnitude of the current in the latter; and a discharge resistance $Hd$ is connected across the ends of the winding $Hs$ so that when the circuit in which the latter is included is broken the current induced in $Hs$ is dissipated in $Hd$. A brake resistance S is fitted one end of which is connected to one of the brush terminals of the motor C, and the other end of which is adapted to be connected to the other brush terminal through a switch articulated to the switch which closes the circuit of the winding $Hs$; in Fig. 3 this switch consists of a rotating disk N mounted on the same spindle as the disk M and having a conducting part $n^1$ which is adapted to connect the two contacts $n, n$, and so connect the brake resistance across the brush terminals of the motor; this connection is, of course, not made until the field winding $Hs$ of the generator has been disconnected from the source of potential; the motor armature, due to the kinetic energy stored up in it, continues to rotate after the generator has ceased to supply current to it; the motor then generates current in the resistance S and uses up kinetic energy quickly and is so brought to rest quickly. Referring now to the disks M and N,—these are feathered on a common spindle which is driven by friction gear from any suitable rotating part at a convenient speed; for instance, as shown in Fig. 4, the disks may be feathered on the spindle 4, on which spindle are also feathered two sliding members 5 the flanges $5a$ of which bear upon the opposite faces of a worm wheel 3 pivotally mounted on the spindle 4 and driven by a worm 2 keyed on the spindle $h$ of the generator H; pressure between the inner faces of $5a$ and the worm wheel 3 is obtained by axial pressure transmitted through the disks M and N, the members 5 and the worm wheel 3, by means of a spring 6 interposed between a washer 8 bearing on the face of N and a nut 7 screwed on the spindle 4, the other end of the said spindle having a head 9 bearing against the outer face of M. The spindle 4 and the parts mounted thereon are supported in ball races 11 carried in a frame 1. The disk M is provided with an annular conducting portion $m^1$ carried from an insulating facing $m^2$ and is provided with two brushes $m$ adapted to bear on the annular conducting portion $m^1$. Similarly, the disk N is provided with a conducting portion $n^1$ carried from an insulating facing $n^2$, and two brushes $n$ are provided, adapted to bear on the annular conducting portion $n^1$. Over the disk M an ironclad electro-magnet 10 is fitted, having an energizing coil $o^2$ and a moving armature or plunger $o^3$, and the disk M is fitted with a notch with which the plunger $o^3$ engages, except when it is held up when the winding $o^2$ is energized. In Fig. 3 the disks M and N, the brushes $m$ and $n$, the spindle $o^3$ and the winding $o^2$ are shown diagrammatically, in order that their connections with the other portions of the apparatus may be clearly illustrated. The winding $o^2$ is connected through the contacts $t$, $t$, of the switch T (termed the traversing switch) to any suitable source of potential, say the mains P, so that when the switch T is closed, the winding $o^2$ is energized and the plunger $o^3$ is raised clear of the notch $o^1$. The switch T is normally held open by a spring $t^3$, and it is closed through the instrumentality of the planer tappet gear; $t^5$ and $t^6$ are adjustable tappets on the table B of the planer; $t^4$ is a lever operated by one or other of the said tappets in the usual way, according to the direction of motion of the table; $t^2$ is a sliding bar connected to the lever $t^4$ and carrying a pawl $t^1$. When the table nears the end of its return stroke, the lever $t^4$ is operated by the tappet $t^6$ and the bar $t^2$ moved to the right, the pawl $t^1$ engaging with the switch T and closing it. The coil $o^2$ is energized, and the plunger $o^3$ drawn clear of the notch $o^1$, whereupon the frictional engagement between the worm wheel 3 and the flanges $5a$ cause the spindle 4, and with it the disks M and N, to rotate, say clockwise; this movement rotates the conducting portion $m^1$ to make contact with the brushes $m$, thus energizing the field of the generator H and causing the rotation of the motor C; this in turn actuates the feed screw $c^1$, which moves the tool box D. After M and N have made a complete rotation, the connection between the field winding H$s$ and the mains P is broken, and the resistance S is connected across the brush terminals of the armature C, thus bringing the motor to rest quickly; before the disks M and N have made one complete revolution the switch T has been released by the tappet gear and opens the circuit of $o^2$, whereupon the plunger $o^3$ drops on to the periphery of the disk M and engages with the notch $o^1$ as soon as the latter comes under it, and so arrests the disks M and N in the position shown in Fig. 3, and retains them in this position until the switch T is again actuated by the tappet gear. Should it be required to reverse the direction of rotation of the feed screw $c^1$, the direction of the current in the winding H$s$ is changed by operation of the reversing switch J. The armature current of the generator, and the current therefore supplied to the armature of the motor, are thus reversed, and the direction of motion of the motor is reversed. The amount of movement imparted to the motor C, while M and N make one turn, may be regulated by regulating the strength of the current in the field winding H$s$ by means of the regulator K.

In the modification described, the time at which the circuit of the generator field magnet winding is closed is determined by the setting of the tappet gear, and the amount of feed given to the feed motor is determined on a time basis, for the circuit remains closed while the disk M makes a definite angular movement; in some cases this mode of operation may not give a sufficiently definite and uniform movement to the feed motor each time it is operated. In the modification illustrated in Fig. 5, the time at which the circuit of the generator field winding is closed is, as in the modification described, determined by the setting of the tappet gear, but this circuit is opened by an organization controlled by the rotation of the feed motor, that is to say, when the feed motor has moved by the desired angular amount from the position in which it stopped at the end of its previous operation, it causes the circuit of the generator field to be opened and is brought to rest, and remains at rest till it is again operated, so that it moves only when it is operating the feed screw and always in the direction for feeding.

Referring now to Fig. 5, as before, G are the mains connected to the feed generator H and to the motor C, S the brake resistance H$s$ and H$d$ the shunt winding and the discharge resistance respectively of H, J the reversing switch, T the traversing switch, and P the supply mains; all arranged substantially as described. The brake resistance S is connected across the terminals $s^1$, $s^2$, and the shunt winding H$s$ is connected through the reversing switch J and the energizing coil $r$ of a magnetic ratchet R to the terminals $h^1$ and $h^2$; as the coil $r$ rotates with the ratchet, connection is made to it through slip rings $r^1$, $r^2$ and suitable brushes. A switch Q is actuated by the solenoid $q$ the winding of which is connected across the mains P through the switch T. When the solenoid $q$ is energized, the switch Q is pulled up into contact with the terminals $h^1$, $h^2$, and is held up by a detent $q^1$ caused to engage in a tooth or teeth on the switch spindle $q^2$ by means of a spring $q^3$ acting on the tail piece $q^4$ of the detent. The ratchet 13

R is driven by the armature of the motor C, driving the feeding screw; and loosely mounted on the spindle of the ratchet is a lever W carrying the pawl $w^1$ normally held from engagement with the ratchet by a spring $w^2$ connected to the tail piece $w^3$ of the pawl. The lever W is normally drawn into engagement with a pin V which can be fitted in any one of a number of holes in the quadrant plate $v^1$. The lever W is drawn into this position by means of a belt $y$ which encircles a pulley Y on the lever boss, which belt is held in tension by a spring $y^2$ one end of which is fixed. Assuming now that the switch Q is in its lower position and making contact with $s^1$ and $s^2$, the resistance S will be connected across the motor and generator armatures. If now the switch T be closed, $q$ is energized, whereupon Q makes contact across $h^1$ and $h^2$, and it is held in this position by the detent $q^1$, thus cutting out the resistance S, and energizing the generator shunt Hs and the coil $r$ of the detent. The motor C connected to the mains G now begins to rotate, carrying the ratchet R with it, and concurrently the pawl $w^1$ is magnetized and drawn into contact with the ratchet R, so that the lever W is carried with the motor until the cam surface $w^4$ on the end of the lever engages with the roller $z^1$ on the releasing lever Z the tail piece $z^2$ of which, by engagement with $q^4$ releases the detent $q^1$ and so allows the switch (the solenoid $q$ of which has been previously deënergized by the opening of the switch T) to drop to its lowermost position, thus deënergizing the winding Hs and connecting the brake resistance S across the armatures of the motor and generator, and stopping them. It will be seen that the angular movement imparted to the motor will depend upon the position of the pin V. In the position shown, when the motor has moved through a quarter of a revolution, it operates the releasing lever Z. More or less angular movement can be imparted, depending upon the position of the pin V. Each time the motor is brought to rest by the switch Q leaving the contacts $h^1$, $h^2$, the magnetic ratchet R is deënergized and the spring $y^2$ therefore pulls the lever W back till the latter engages with the pin V; the particular hole of the series of holes in the plate $v^1$ in which the pin V is inserted thus determines the initial position of the lever W at the moment its pawl $w^1$ engages with the ratchet R, and as the lever W always trips Z when $w^4$ comes under $z^1$, it will be seen that the angular movement imparted to the motor spindle $c$, the ratchet R and the lever W during the interval between the connection and disconnection of the contacts $h^1$ and $h^2$ depends upon the initial position of the lever W; when the pin V is in the hole in which it is shown in the drawings, the movement imparted to the motor armature during the said interval will be about 90°; if, however, the pin V were placed in, say, the fifth hole from the left, the lever movement and therefore the armature movement would be about 180°, and if the pin were placed in the top hole on the right, the said movement would be about 270°.

It is to be understood that Figs. 3 and 5 are diagrammatic and that the details of construction may be varied to suit particular cases.

According to the arrangement described, it will be seen that the supply of current to the motor is cut off, by deënergizing the winding Hs, after the motor has made a definite angular movement, and there are obviously many other arrangements than the one illustrated by way of example, by which this can be effected.

Where, as in very large tools, there are more than the one feed-screw to give the traverse, each may have a separate motor and the motors may be geared together; or the one motor may operate both feed-screws.

Having now fully described my invention I declare that what I claim and desire to secure by Letters Patent is;—

1. A machine of the class described having a reciprocating part, and a feed screw, comprising in combination, an electro-motor provided with an armature, a constantly driven generator having an armature and field winding respectively, said motor being geared to the feed screw, the armature of said motor being connected in series with the generator armature, a source of potential, a field control switch adapted when closed to connect said field winding to said source of potential; tappets on the reciprocating part; means actuated by said tappets and adapted to effect the closing of the said field control switch; and means for preventing the closure of the field control switch beyond a predetermined interval, substantially as described.

2. A machine of the class described having a reciprocating part, and a feed screw, comprising in combination, an electro-motor provided with an armature, a constantly driven generator having an armature and field winding respectively, said motor being geared to the feed screw, the armature of said motor being connected in series with the generator armature, a source of potential, a brake resistance adapted to be connected across the motor armature; a field control switch adapted to connect said field winding to said source of potential; a brake switch connected to said field control switch and adapted when the latter disconnects the said field winding from the source of potential to connect the brake resistance across the motor armature; tappets on the reciprocating part; means actuated by said tappets and adapted to effect the closing of the said field control switch; and means for preventing the closure of the field control switch beyond a predetermined interval, substantially as described.

3. A machine of the class described having a reciprocating part and a feed screw, comprising in combination, an electro-motor provided with an armature, a constantly driven generator having an armature and field winding respectively, said motor being geared to the feed screw, the armature of said motor being connected in series with the generator armature, a source of potential, a field control switch adapted when closed to connect said field winding to said source of potential; a traverse switch, actuated by the tappets on the reciprocating part, and adapted when closed to effect the closing of the field control switch; and means for preventing the closure of the field control switch beyond a predetermined interval, substantially as described.

4. A machine of the class described having a reciprocating part and a feed screw, comprising in combination, an electro-motor provided with an armature, a constantly driven generator having an armature and field winding respectively, said motor being geared to the feed screw, the armature of said motor being connected in series with the generator armature, a source of potential, a brake resistance adapted to be connected across the motor armature; a field control switch adapted to connect said field winding, to said source of potential, a brake switch connected to said field control switch and adapted, when the latter disconnects the said field winding from the source of potential, to connect the brake resistance across the motor armature; tappets on the reciprocating part, a traverse switch actuated by said tappets, and adapted when closed to effect the closing of the field control switch; and means for preventing the closure of the field control switch beyond a predetermined interval, substantially as described.

5. A machine of the class described having a reciprocating part and a feed screw, comprising in combination, an electro-motor provided with an armature, a constantly driven generator having an armature and field winding respectively, said motor being geared to the feed screw, the armature of said motor being connected in series with the generator armature, a source of potential, a field control switch adapted when closed to connect said field winding to said source of potential; tappets on the reciprocating part, means actuated by said tappets and adapted to effect the closing of the said field control switch; and means for preventing the closure of the field control switch beyond a predetermined interval, substantially as described; and a rheostat in the field winding circuit adapted to vary the magnitude of the current in the said circuit, substantially as described.

6. A machine of the class described having a reciprocating part and a feed screw, comprising in combination, an electro-motor provided with an armature, a constantly driven generator having an armature and field winding respectively, said motor being geared to the feed screw, the armature of said motor being connected in series with the generator armature, a source of potential, a field control switch adapted when closed to connect said winding to said source of potential; tappets on the reciprocating part; means actuated by said tappets and adapted to effect the closing of the said field control switch; and means operated by the motor preventing the closure of the field control switch when the motor has imparted to the feed screw the desired angular movement; substantially as described.

7. A machine of the class described having a reciprocating part and a feed screw, comprising in combination, an electro-motor provided with an armature, a constantly driven generator having an armature and field winding respectively, said motor being geared to the feed screw, the armature of said motor being connected in series with the generator armature, a source of potential; a field control switch adapted to connect said field winding to the source of potential; electro-magnetic means for operating the said switch; tappets on the reciprocating part; and a traversing switch operated by said tappets and adapted to connect said electro-magnetic means to the source of potential; substantially as described.

8. A machine of the class described having a reciprocating part and a feed screw, comprising in combination, an electro-motor provided with an armature, a constantly driven generator having an armature and field winding respectively, said motor being geared to the feed screw, the armature of said motor being connected in series with the generator armature, a source of potential; a field control switch adapted to connect said field winding to the source of potential, electro-magnetic means for operating the said switch; tappets on the reciprocating part; a traversing switch operated by said tappets and adapted to connect said electro-magnetic means to the source of potential; detent means adapted to hold the field control switch in position for connecting the field winding to the source of potential; and means operated by the motor adapted to release said detent; substantially as described.

9. A machine of the class described having a reciprocating part and a feed screw, comprising in combination, an electro-motor provided with an armature, a constantly driven generator having an armature and field winding respectively, said motor being geared to the feed screw, the armature of said motor being connected in series with the generator armature, a source of potential; a field control switch adapted to connect said field winding to the source of potential; electro-magnetic means for operating the said switch; tappets on the reciprocating part; a traversing switch operated by said tappets and adapted to connect said electro-magnetic means to the source of potential; a ratchet connected to the motor; a magnetizing coil in series with the generator field winding and adapted to magnetize the ratchet, a releasing lever adapted to release said detent means; and a pawl carried by said lever and forming an armature which is attracted into engagement with the ratchet when the latter is magnetized; substantially as described.

10. A machine of the class described having a reciprocating part, and a feed screw, comprising in combination, an electro-motor provided with an armature, a constantly driven generator having an armature and field winding respectively, said motor being geared to the feed screw; the armature of said motor being connected in series with the generator armature, a source of potential; a field control switch adapted to connect said field winding to the source of potential; electro-magnetic means for operating the said switch; tappets on the reciprocating part; a traversing switch operated by said tappets, and adapted to connect said electro-magnetic means to the source of potential; a ratchet connected to the motor; a magnetizing coil in series with the generator field winding and adapted to magnetize the ratchet; a releasing lever adapted to release said detent means; a pawl carried by said lever and forming an armature which is attracted into engagement with the ratchet when the latter is magnetized; spring controlled means for imparting angular movement to the said releasing lever in the opposite direction to that in which it is moved by the ratchet; and angularly adjustable means for arresting the movement imparted to said releasing lever by said spring control; substantially as described.

11. A machine of the class described having a reciprocating part, and a feed screw, comprising in combination, an electro-motor provided with an armature, a constantly driven generator having an armature and field winding respectively, said motor being geared to the feed screw, the armature of said motor being connected in series with the generator armature, a source of potential; a brake resistance adapted to be connected across the motor armature; a two-way switch adapted normally to connect the brake resistance across the motor armature and when operated to connect the generator field winding to the source of potential; tappets on the reciprocating part; means actuated by said tappets for operating the two way switch; a detent for holding the two way switch in the position in which it connects the field winding to the said source of potential, and means operated by the motor armature for releasing the said detent, substantially as described.

In testimony whereof I affix my signature in presence of two witnesses.

ARTHUR PEMBERTON WOOD.

Witnesses:
 ROBT. O. ROBERTS,
 JOSEPH E. HIRST.